United States Patent
Brown

(10) Patent No.: US 7,665,344 B2
(45) Date of Patent: Feb. 23, 2010

(54) TEST DEVICE FOR INTERNAL COMBUSTION ENGINE

(75) Inventor: Clive Alan Brown, Northants (GB)

(73) Assignee: Premier Diagnostics Limited (GB)

( * ) Notice: Subject to any disclaimer, the term of this patent is extended or adjusted under 35 U.S.C. 154(b) by 0 days.

(21) Appl. No.: 10/532,035

(22) PCT Filed: Oct. 16, 2003

(86) PCT No.: PCT/GB03/04501

§ 371 (c)(1),
(2), (4) Date: Feb. 2, 2006

(87) PCT Pub. No.: WO2004/038361

PCT Pub. Date: May 6, 2004

(65) Prior Publication Data

US 2006/0150713 A1    Jul. 13, 2006

(30) Foreign Application Priority Data

Oct. 23, 2002   (GB)  ................................. 0224671.8

(51) Int. Cl.
*G01M 15/10*   (2006.01)
(52) U.S. Cl. .................................................. 73/23.31
(58) Field of Classification Search ................ 73/23.31, 73/23.32, 23.33
See application file for complete search history.

(56) References Cited

U.S. PATENT DOCUMENTS

| | | | | |
|---|---|---|---|---|
| 5,105,651 A | * | 4/1992 | Gutmann | 73/23.31 |
| 5,431,042 A | * | 7/1995 | Lambert et al. | 73/116 |
| 5,506,772 A | * | 4/1996 | Kubozono et al. | 701/29 |
| 5,555,498 A | * | 9/1996 | Berra et al. | 701/33 |
| 5,592,296 A | * | 1/1997 | Pye | 356/435 |
| 5,671,158 A | | 9/1997 | Fournier et al. | |
| 5,675,490 A | * | 10/1997 | Bachhuber | 701/32 |
| 5,781,125 A | * | 7/1998 | Godau et al. | 340/870.01 |
| 5,864,783 A | * | 1/1999 | Struck et al. | 702/184 |
| 5,935,180 A | * | 8/1999 | Fieramosca et al. | 701/29 |
| 6,094,609 A | | 7/2000 | Arjomand | |
| 6,287,519 B1 | | 9/2001 | Nordman et al. | |
| 6,308,130 B1 | * | 10/2001 | Vojtisek-Lom | 701/114 |
| 6,435,019 B1 | * | 8/2002 | Vojtisek-Lom | 73/118.1 |
| 6,807,469 B2 | * | 10/2004 | Funkhouser et al. | 701/33 |
| 2002/0004694 A1 | * | 1/2002 | McLeod et al. | 701/29 |
| 2002/0118657 A1 | * | 8/2002 | Winchell et al. | 370/329 |
| 2003/0159044 A1 | * | 8/2003 | Doyle et al. | 713/176 |

FOREIGN PATENT DOCUMENTS

EP    1063507    11/2001

(Continued)

OTHER PUBLICATIONS

Derwent abstract for JP08331766-A.*

*Primary Examiner*—Daniel S Larkin
(74) *Attorney, Agent, or Firm*—Nelson Mullins Riley & Scarborough, L.L.P.

(57) ABSTRACT

A device for testing exhaust emissions of an internal combustion engine utilizing wireless real time data transfer to permit outdoor testing via an indoor base station. A hand portable display device provides instructions to an operator, and a gas sensor/analyzer detects combustion gas content. The base station, display device and sensor/analyzer preferably communicate by radio.

18 Claims, 2 Drawing Sheets

FOREIGN PATENT DOCUMENTS

| JP | 3-115963 | * | 5/1991 | ................ 73/23.31 |
| JP | 08331766 A | * | 12/1996 | |
| JP | 9-251328 | * | 9/1997 | |
| JP | 2002/197155 | | 7/2002 | |
| WO | 00/34838 | | 6/2000 | |

* cited by examiner

TEST DEVICE FOR INTERNAL COMBUSTION ENGINE

This invention relates to a test device for an internal combustion engine, and particularly though not exclusively to a device for analysing exhaust gas.

Environmental considerations require that exhaust emissions of internal combustion engines are maintained within predetermined limits. In many cases such limits are the subject of specific legislation.

In the case of motor vehicles, exhaust emission levels are checked at the periodic test of fitness for use. In the UK such a test is performed annually for each year after the third from initial vehicle registration. Such a test is necessary in order to ensure that a deterioration in exhaust emissions is corrected at the earliest opportunity.

Different tests may be specified according to national legislative requirements, and according to the type of internal combustion engine. In particular, the exhaust emissions of gasoline and diesel engine have different characteristics. In the case of diesel engines particulate emissions are of particular concern since in high concentrations they may be carcinogenic. One method of detecting high exhaust emissions is to measure the opacity of a gas sample, such as in the smoke test of a diesel engine.

A typical fitness for use test is carried out within a closed building and comprises detailed examination of the vehicle structure. Emissions testing requires the vehicle engine to be running, and the specified test procedure may require the engine to run for several minutes, and be subjected to successive accelerations. It will be understood that these procedures inevitably produce exhaust emissions, which may be heavily fuel laden in the case of no load accelerations.

It would be desirable for the emissions part of the vehicle test to be performed out of doors, or with the vehicle exhaust connected to an extractor system. This is often considered impractical because in the first case space requirements may be limited, and in cold weather it is undesirable to continually open and close the workshop doors. In the second case an extractor may influence engine performance by reducing or increasing back pressure on the exhaust.

Furthermore many test procedures require the tester to follow a predetermined test routine displayed on a control device, for example a dedicated processor with display, or a personal computer. For obvious reasons it is not convenient to continually move such equipment from inside a building to outside, and back.

A further significant problem is that of communicating signal readings from exhaust gas sensor to a base station having the necessary controls and print function. The gas sensor is typically hard wired to the base station, and the usual flexible lead is both vulnerable to damage and likely to present a tripping danger for personnel. Plainly the provision of a longer lead for outside testing increases both of these risks substantially. As mentioned above this solution is somewhat impractical if test procedures are displayed inside the building.

What is required is an improved test device which can overcome the aforementioned problems.

According to one aspect of the invention there is provided a device for testing the exhaust emissions of an internal combustion engine and comprising a base station, an exhaust gas sensor, and a hand portable display device having data input means, wherein said base station, sensor and display device further include wireless real-time data transfer means whereby data can be transmitted and received therebetween.

According to a second aspect of the invention there is provided a device for testing the exhaust emissions of an internal combustion engine and comprising a base station, an exhaust gas sensor, and a hand portable display device having data input means, wherein said base station, sensor and display device further include radio communication means whereby data can be transmitted and received therebetween.

By the term 'exhaust gas' we mean any exhaust emission of a vehicle including, but not limited to, smoke laden emissions of a diesel engine.

The arrangement of the invention allows vehicle emissions testing to take place outside, and at any location within range of the base station. Hard wiring of the gas sensor is avoided. The test operator may sit in the vehicle driving seat and follow instructions on the hand portable display device, and accordingly may keep the vehicle window closed—in this way the operator is not exposed to exhaust gases, particularly diesel emissions. Furthermore the operator does not need to keep the display of the control device in sight.

In a preferred embodiment the real-time data transfer is by radio communication means.

In a typical test procedure, the operator will initialize the equipment by for example entering the make and model of vehicle, and any other necessary control parameters. The vehicle will be placed outside, and the exhaust gas sensor positioned at the exhaust outlet. The operator will take the display device to the vehicle, and sit inside with doors and windows closed. The vehicle engine will be started, and brought to optimum test conditions, for example by ensuring engine temperature is at the normal operating level.

The operator will start the test routine by entering data into the display device, and will then follow a routine displayed on this device. Such a routine will typically prescribe certain acceleration cycles, and periods of running at a prescribed engine rpm.

During or following the test information will pass from the display device and the gas sensor to the base station, and control information may be emitted from the base station. The conclusion of the test will be signalled from the display, and the results typically printed out at the base station.

In the preferred embodiment, the gas sensor includes an integral gas analyser, and accordingly a test result is transmitted to the base station rather than test data Such an arrangement may reduce the risk of data corruption, and furthermore reduce radio traffic substantially. The base station may include a memory and printer. Data transfer is preferably in real-time so as, for example, to ensure that the test results are available in printed form when the operator returns to the base station.

A docking port may be provided on the base station of the gas sensor. Such a port permits instant recharging of sensor batteries whilst permitting periodic self checking and calibration routines. The docking port may further include heating means whereby the sensor is maintained at a suitable operating temperature. The docking port may also permit data transfer between the base station and the gas sensor.

The base station may also include a docking port for the display device so as to permit opportunistic recharging of an internal battery. Such a docking port preferably orientates the display device for convenient use on the base station so that, if necessary, the test operator can enter initialization data via the display device. Alternatively the base station may include a separate keypad/keyboard. This docking port may also permit data transfer.

The docking ports may have physical connections to the respective component, or may be contactless.

In a preferred embodiment the device further includes an engine oil temperature probe having radio communication means for communicating with the display device. Such a probe provides information to the test operator concerning engine temperature, and is useful in determining when the test is to be started. It will be understood that an engine temperature signal may be used to prevent the emissions test being performed until a predetermined minimum temperature has been reached.

In another preferred embodiment the base station may include a smart card access device for enabling the test routine. Such an arrangement ensures that use of the device can be restricted to suitably qualified and authorized personnel. The smart card access device is preferably linked to other components by wireless communication in real time.

Optionally the device further includes an engine speed sensor having radio communication means for communicating with the display device. Such a speed sensor provides information to the test operator concerning engine speed, and permits the operator to follow a test routine with precision.

Other features of the invention will be apparent from the following description of a preferred embodiment shown by way of example only in the accompanying drawings in which:—

Figure 1:
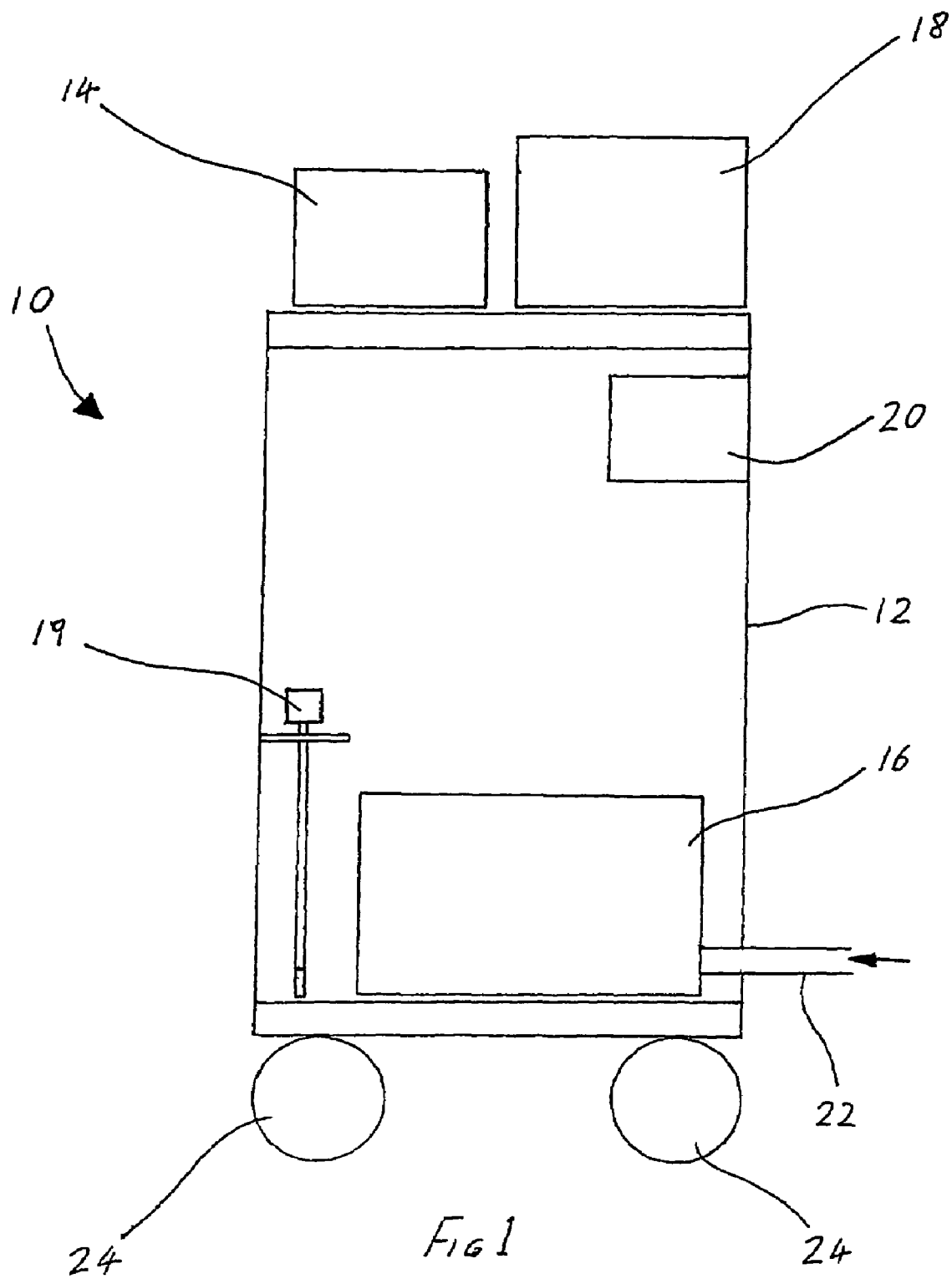
FIG. 1 is a diagrammatic representation of a device for testing exhaust emissions according to the present invention.

Referring firstly to FIG. 1 there is shown a device for testing exhaust emissions according to the present invention, generally designated 10. The device 10 comprises a trolley 12 having a base station 14, an exhaust gas analyser 16, a hand portable display device 18, an oil temperature sensor 19 and a smart card port 20 arranged thereon. The exhaust gas analyser 16, hand portable display device 18 and oil temperature sensor 19 are detachable from the trolley for use during operation of the device. The base station 14 has a printer and a full size keyboard (not shown) and the hand portable device 18 has a keypad (not shown) for data entry. The exhaust gas analyser 16 has an intake tube 22 for location in or on a vehicle exhaust pipe. The trolley 12 is further provided with wheels 24 to enable wheeling of the trolley to required locations.

The trolley has a power source (not shown) to provide the required power to the base station 14, exhaust gas analyser 16, hand portable display device 18, oil temperature sensor 19 and smart card port 20. The power source is typically mains electricity supplied via cable. The exhaust gas analyser 16, hand portable display device 18 and oil temperature sensor 19 have power packs (not shown) to provide the necessary power when they are remote from the trolley 12. The power packs are charged by charging means when the exhaust gas analyser 16, hand portable display device 18 and oil temperature sensor 19 are on the trolley 12. The charging means have suitable connectors, but alternatively may be of the inductive kind having no metallic contacts between the trolley 12 and the detachable trolley components.

The exhaust gas analyser 16 may further be provided with a heater (not shown) to inhibit the formation of condensation therewithin. This is a useful feature since the repeated cycle of transporting the device 10 from a warm environment to a cold environment may cause the formation of condensation which may be detrimental to operation of the gas analyser.

Figure 2:
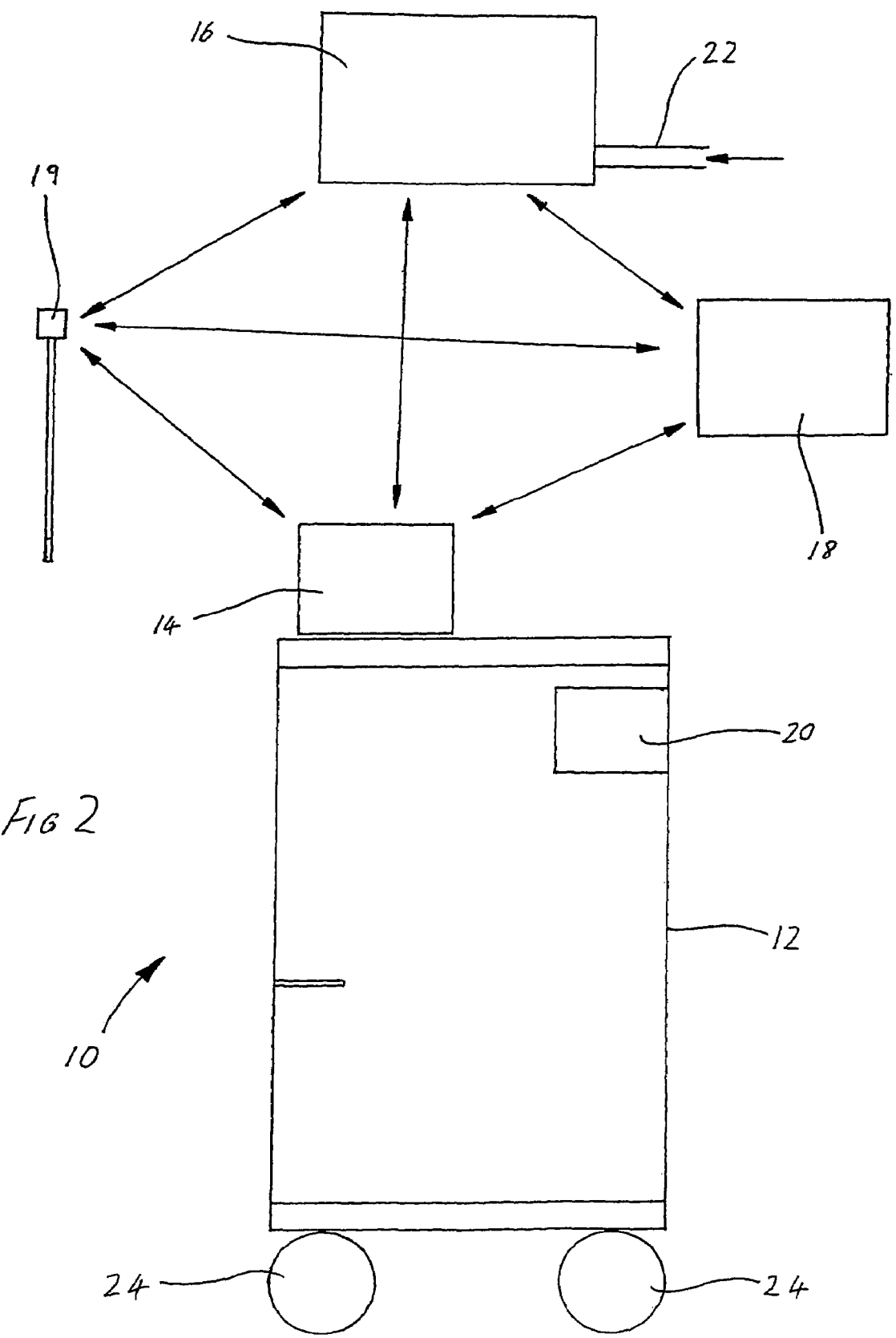
FIG. 2 is a diagrammatic representation of a device for testing exhaust emissions with some of the component parts detached from the device.

Referring now to FIG. 2 there is shown a diagrammatic representation of a device for testing exhaust emissions with some of the component parts detached from the device. Features similar to the device 10 of FIG. 1 have like reference numerals. The base station 14, exhaust gas analyser 16, hand portable display device 18 and oil temperature sensor 19 are provided with radio transmitters and receivers (not shown) to allow the transmission of information and data therebetween indicated by the double headed arrows in FIG. 2. In some embodiments some devices, such as the temperature sensor, may transmit only.

In use the trolley 12 is placed in a suitable location near to the usual test location, for example, adjacent an inside vehicle lift. The exhaust gas analyser 16, hand portable display device 18 and oil temperature sensor 19 are detached from the trolley 12 and taken to the vehicle at a somewhat remote location, typically outside. The intake tube 22 of the exhaust gas analyser 16 is located in the exhaust pipe of the vehicle and the oil temperature sensor 19 is located in place of an engine oil dip stick of the vehicle. The device 10 is initialised by an operator placing a smart card into the smart card port 20. This ensures that the device can only be used by operators possessing an authorised smart card. The smart card reader may communicate in real time by radio transmitter/receiver, and the reader may further include a manual override, for example protected by password.

In use, the hand portable display device 18 is taken into the vehicle and the operator follows the instructions presented on the display device 18.

Radio communication between the base station 14, exhaust gas analyser 16, hand portable display device 18 and oil temperature sensor 19 permits information concerning the exhaust gases to be transmitted in real time. Alternatively memory cards in the communicating components of the device 10 permit the information to be stored and transmitted on demand. The hand portable device 18 is also provided with a spare port (not shown) of the type RS232 should it be necessary to operate the hand portable device 18 with a conventional wire connection.

Optionally the device 10 has an engine speed sensor (not shown) which can be located on the engine of the vehicle whose exhaust emissions are to be tested. The engine speed sensor is also provided with radio communication means to allow further test data to be captured and processed if necessary. In particular the engine speed sensor may help to provide further information relating to the exhaust gas at different engine speeds.

Whilst a preferred embodiment for the device has been described it will be appreciated that many other designs of the trolley exist that would have the desired effect of the invention with the proviso that the device transmits information relating to exhaust gases either in real time or saves the information for transmission in wireless form at a later time. Delayed transmission may be desired in order to allow radio traffic to be prioritised.

Although the invention has been described in relation to trolley mounted equipment, it will be readily understood that the base station could be bench mounted, or part of a dedicated fixed installation.

The invention claimed is:

1. A device for testing the exhaust emissions of an internal combustion engine comprising a base station having respective docking ports for a portable exhaust gas sensor adapted for positioning at the exhaust gas outlet, and for an in-vehicle hand portable display device having a data input terminal comprising a keypad, wherein said base station, gas sensor and display device each include a wireless real-time data transmitter and receiver whereby data concerning the exhaust gases can be transmitted and received therebetween during an exhaust emissions test, and wherein said gas sensor and display device are detachable from said base station for independent use and each include power packs to provide the necessary power when they are remote from the base station.

2. A device according to claim 1, wherein said wireless real time data transmitter and receiver uses radio signals so that data can be transmitted and received therebetween.

3. A device according to claim 1, wherein the gas sensor includes a gas analyser.

4. A device according to claim 1, wherein the base station includes a memory and printer.

5. A device according to claim 1, wherein said docking port includes a heater whereby said sensor can be maintained at a desired operating temperature.

6. A device according to claim 1, wherein said docking port is adapted to transfer data between the base station and the gas sensor.

7. A device according to claim 1, wherein said docking port orientates the display device for use on the base station.

8. A device according to claim 1, and further including an engine oil temperature probe having at least one of a wireless real-time data transmitter and receiver for communicating with the display device.

9. A device according to claim 1, wherein the base station includes a smart card access device for enabling a test routine.

10. A device according to claim 1, and further including an engine speed sensor having at least one of a wireless real-time data transmitter and receiver for communicating with the display device.

11. A device for testing the exhaust emissions of an internal combustion engine comprising: a base station, a remote exhaust gas sensor, and a remote hand portable display device having a data input terminal comprising a keypad, each being detachable from the base station for independent use, wherein said base station, sensor and display device further include at least one of a radio transmitter and receiver whereby data can be transmitted and received therebetween.

12. A device according to claim 11, wherein the gas sensor includes a gas analyser.

13. A device according to claim 11, wherein the base station includes a memory and printer.

14. A device according to claim 11, wherein a docking port is provided on the base station for said gas sensor.

15. A device according to claim 14, wherein said docking port includes a heater whereby said sensor can be maintained at a desired operating temperature.

16. A device according to claim 14, wherein said docking port is adapted to transfer data between the base station and the gas sensor.

17. A device according to claim 11, and further including a docking port for the display device.

18. A device according to claim 17, wherein said docking port orientates the display device for use on the base station.

* * * * *